Dec. 10, 1968     C. J. BARECKI ET AL     3,415,462

VEHICLE SAFETY REEL

Filed Aug. 7, 1967     2 Sheets-Sheet 1

INVENTORS
Chester J. Barecki
Walter E. Nordmark

BY Dawson, Tilton, Fallon, and Lungmus

ATTORNEYS

Dec. 10, 1968          C. J. BARECKI ETAL          3,415,462
                       VEHICLE SAFETY REEL
Filed Aug. 7, 1967                                 2 Sheets-Sheet 2

INVENTORS
Chester J. Barecki
Walter E. Nordmark
BY Dawson, Tilton, Fallon,
and Bungmus.
ATTORNEYS

United States Patent Office 3,415,462
Patented Dec. 10, 1968

3,415,462
VEHICLE SAFETY REEL
Chester J. Barecki and Walter E. Nordmark, Grand Rapids, Mich., assignors to American Seating Company, Grand Rapids, Mich., a corporation of Delaware
Filed Aug. 7, 1967, Ser. No. 658,842
6 Claims. (Cl. 242—107.4)

ABSTRACT OF THE DISCLOSURE

To protect the occupant of a car in case of collision or sudden stopping of the vehicle, shoulder straps about the occupant are connected with a cable which extends within a casing and around a drum equipped with a spring which tends to draw the cable toward the drum. The drum is rotatably mounted upon a vertically-positioned pivot pin within the casing, and above the drum is positioned a rotatable and vertically-slidable inertia disk equipped with upwardly-extending ratchet teeth adapted to engage with ratchet teeth carried by a fixed plate in the top of the casing. The disk and drum members are connected in all positions by lug and socket connections. Cam means between the inertia disk and drum are effective to raise the disk into locking engagement with the teeth of the fixed plate when there is a sudden pull of the cable as in the case where the vehicle is suddenly decelerated, thus checking the cable against outward movement, while immediately after the checking of the cable movement the disk is allowed to fall under its own weight to free the cable.

Summary

As shown in Patents No. 2,898,976 and No. 2,899,146, safety straps may be employed about the shoulders of a car occupant, the straps being connected to a cable extending upwardly to a reel device fixed to the top or frame of the vehicle, the safety reel being adapted to take up slack in the cable and to pay out the cable in response to forward movement of the seat occupant but automatically locking against paying out the cable upon abrupt deceleration of the vehicle. The structures have the advantage of permitting the occupant free normal movement in operating and driving the vehicle, etc., while at the same time protecting the occupant in the event of sudden stoppage of the vehicle when the occupant would otherwise be thrown forward and injured.

In addition to the protection provided by the structures described above, there has also been a need for some component in such a structure which will immediately free the occupant after the checking of the cable has protected him from being thrown forwardly so that he will be free immediately to take other protective measures, and an object of the present invention is to provide a combination of parts which will yield this result. A further object is to provide a structure in which the protective device is effective at relatively low G forces, as, for example as low as ⅗ of G. Yet another object is to provide means for distributing the load over a wide area, with the engaging ratchet teeth of the parts extending around the periphery of the parts. Other specific objects will appear as the specification proceeds.

In the vehicle safety reel structure, a hollow casing having a vertically-positioned pivot pin is provided with a cable drum member rotatably mounted on the pin and with a coil spring for normally drawing the cable about the drum. An inertia disk member pivotally and slidably mounted above the drum is provided with upwardly-extending ratchet teeth, and lug and socket slide connections connect the disk and drum in all positions of the disk. A fixed plate at the top of the casing is provided with depending ratchet teeth which interlock with the teeth of the inertia disk when the disk is raised, but are spaced therefrom when the disk is in its lower normally operating position. Cam means between the drum and disk are actuated by sudden forward movement of the cable for raising the disk, by reason of its inertia, to locking position, but permitting the disk to drop under its own weight to unlocked position immediately after the locking engagement. A spring between the drum and disk is preferably employed to make the inertia plate or disk responsive to relatively low G forces.

Drawings

Figure 1:
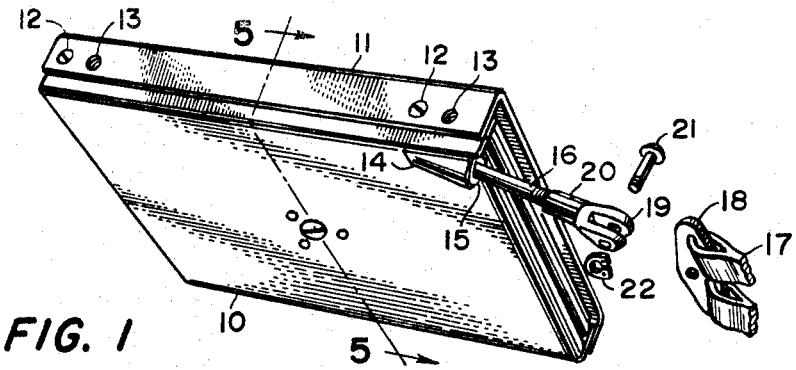
Figure 2:
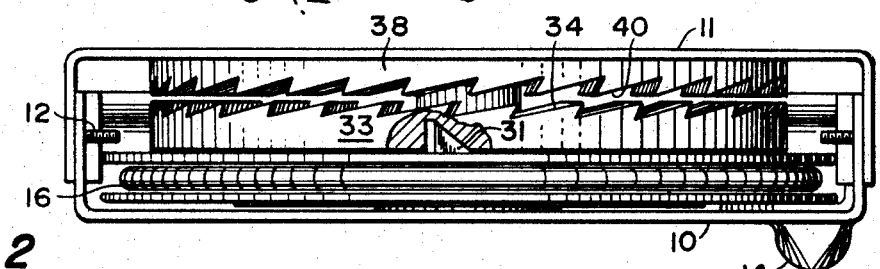
Figure 3:
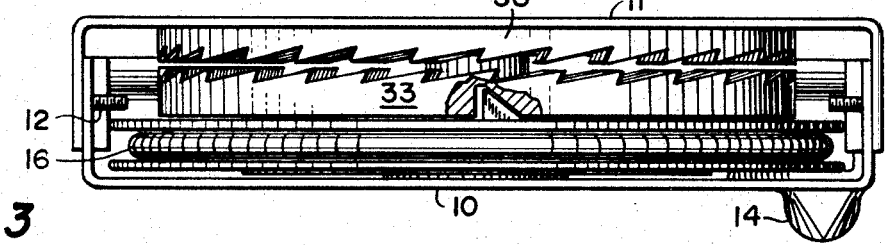
Figure 4:
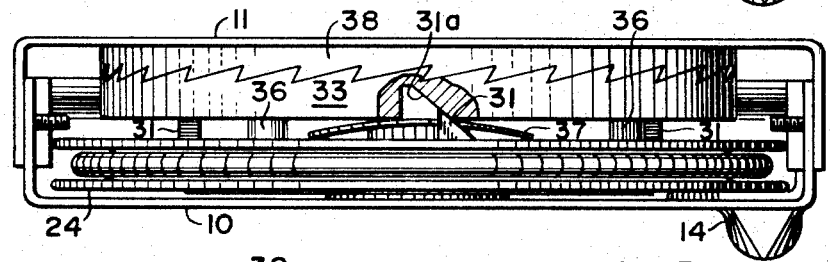
Figure 5:
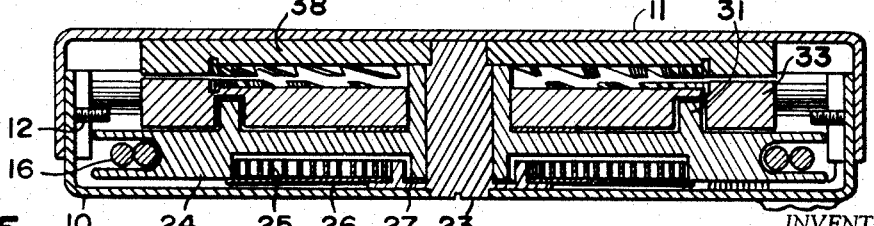
Figure 7:
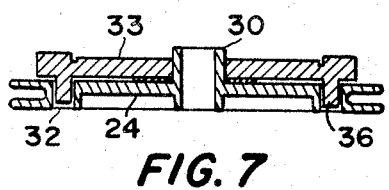
Figure 6:
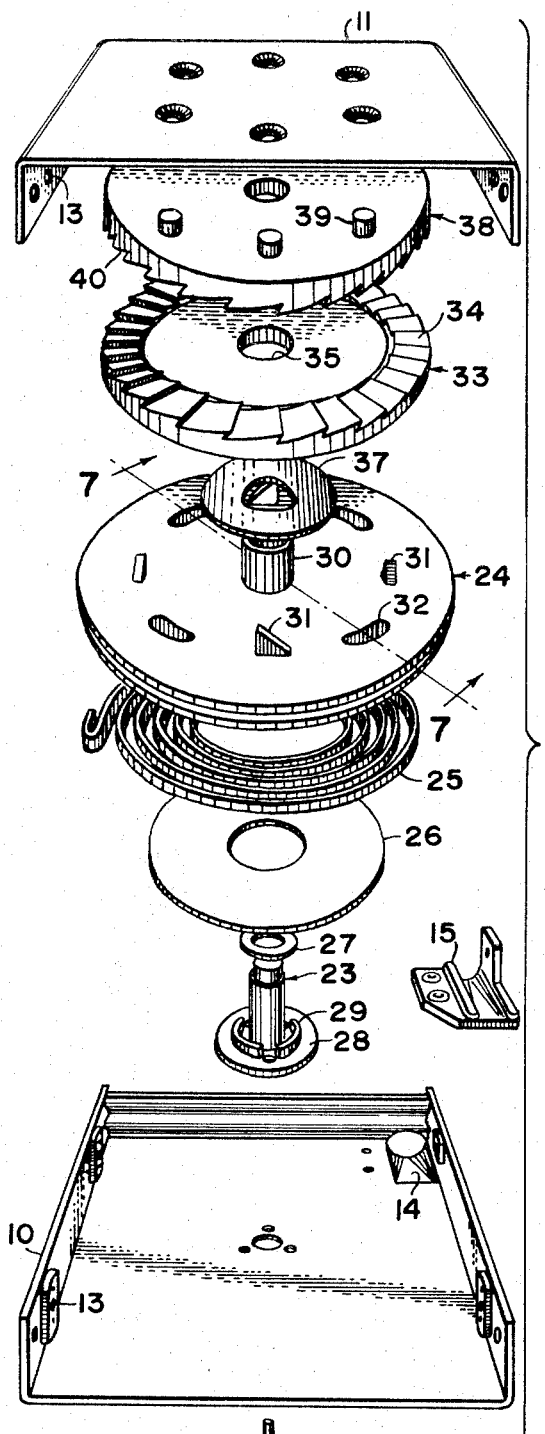

In the accompanying drawings, FIG. 1 is a perspective view of a reel embodying our invention and including the yoke of the shoulder harness; FIG. 2, a rear view of the reel showing the operating mechanism at rest; FIG. 3, a view similar to FIG. 2 but showing the mechanism in normal operating position; FIG. 4, a view similar to FIG. 3 but showing the mechanism locked in the hold position due to a sudden deceleration of the vehicle and forward pull of the cable; FIG. 5, a cross-sectional view, the view being taken as indicated at line 5—5 of FIG. 1; FIG. 6, an exploded perspective view showing the parts of the reel in separated relation; and FIG. 7, a transverse sectional view, the section being taken as indicated at line 7—7 of FIG. 6.

Detailed description

In the illustration given in the drawings. 10 designates the lower part of the hollow casing and 11 the upper part of the casing, the casing members being held together by screw members 12. If desired, the sides of the casing may also be provided with threaded openings 13 for receiving screws to attach the structure to frame or connecting parts for supporting the casing in the top portion of the vehicle.

The lower casing 10 is also provided with a cable guide 14, and within the guide is preferably mounted a plastic anti-friction member 15 consisting of nylon or other suitable material.

A cable 16 is connected to harness straps 17 by means of a yoke or evener 18 received within the bifurcated end 19 of the connector 20 secured to the cable 16. A grooved pin 21 extends through aligned openings in the elements 1 8and 19 and is secured therein by fastener 22.

The lower casing member 10 is provided with a vertically-extending pivot pin 23, as shown best in FIG. 5, and supports a rotatable cable drum 24 which receives cable 16. A coil return spring 25 is located in the lower portion of the casing and places a slight tension upon the cable tending to draw it within the casing while at the same time permitting sufficiently free outward movement of the cable to permit the car occupant to move forwardly and rearwardly in the normal driving or riding positions. The spring 25 rests upon an apertured plate 26, and below the disk 26 is a washer 27. The pivot pin 23 is integrally formed at its bottom with a flange 28 having upwardly-projecting rib portions 29.

The cable drum 24 is provided with a sleeve 30 which receives the pivot pin 23, and at its top is provided with four cam members 31. The drum is also provided with lug recesses or sockets 32 extending between the cam members 31, as shown best in FIGS. 6 and 7.

Above the drum 24 is an inertia disk or plate 33 having at its top peripheral portion a series of ratchet teeth 34. The disk is centrally apertured at 35 to receive the sleeve 30 of the drum 24 and is thus rotatably mounted while also being vertically slidable. The disk 33 is provided with depending lugs 36, as shown best in FIG. 7, and received within the slots 32 of the drum 24 so as to connect the drum and disk both in the lower and raised positions. The disk is also provided with cam recesses aligned with the cams 31 of drum 24 and provided with an inclined cam-engaging surface 31a, as shown best in FIG. 4.

Between the drum and disk members may be placed a spring 37 which urges the disk 33 slightly upwardly and permitting it to respond to a lower G force in the locking arrangement which is now to be described.

Above the disk 33 is a fixed plate or disk 38 which is connected to the top casing member 11 by a series of pins 39, as shown best in FIG. 6. The plate 38 is provided on its underside with depending ratchet teeth 40 adapted to interlock with teeth 34 of disk 33 when disk 33 is moved upwardly due to a sudden deceleration of the vehicle.

In the operation of the safety reel structure, the cable 16 normally yields with movements of the occupant against the force of the relatively weak return spring 25, thus allowing the operator to move freely forwardly and laterally along the seat, but should the vehicle suddenly decelerate, causing the occupant to be moved forwardly, the sudden rotation of the drum causes the inertia disk 33 to move upwardly under the force of cam 31 in engagement with the inclined recess surface 31a, as shown best in FIG. 4, to bring about interlocking of the disk and fixed plate 38. However, the cam-engaging surfaces 31 and 31a do not maintain the interlocking engagement but permit immediate dropping of the inertia disk 33 to the normal operating position, shown best in FIG. 3, and thus enable the occupant of the car immediately after he has been restrained against forward movement to be free for carrying through other protective movements, such as, for example, turning off the motor, removing the harness, opening the door, or various other movements which may be needed after the accident or emergency. The disk 33 drops under its own weight to the operating position shown in FIG. 3, compressing the spring 37 and permitting the drum to rotate freely under the force of coil spring 25 only. As soon as the pull on the cable 16 is released, the inertia disk 33 returns by force of gravity to its lower position, flattening spring 37, and the return spring 25 rewinds the cable 16.

In the foregoing structure, the load is distributed over a wide area since the teeth of plates 33 and 38 are peripherally located, while at the same time space is provided interiorly for the compensating spring 37 which is effective in making the device responsive to low G forces, preferably within the range of 3/8 to 2½ G's.

While in the foregoing specification we have set out specific structure in considerable detail for the purpose of illustrating an embodiment of our invention, it will be understood that such details may be varied widely by those skilled in the art without departing from the spirit of our invention.

We claim:

1. In a vehicle safety reel structure, a hollow casing having a vertically-positioned pivot pin, a cable drum member in said casing rotatably mounted on said pin, a cable about said drum having an end portion extending downwardly from said casing, spring means normally rotating said drum to draw the cable toward said drum, an inertia disk member rotatably and slidably mounted in said casing above said drum and provided with upwardly-extending ratchet teeth, lug and socket slide connections between said disk and drum, a fixed plate at the top of the casing provided with depending ratchet teeth adapted to interlock with the teeth of the inertia disk when the disk is raised but spaced therefrom when the disk is in its lower normally-operating position, and cam means between said drum and disk actuated by sudden forward movement of said cable for raising said disk through its inertia to locking position but permitting said disk to drop to unlocked position immediately after said locking engagement.

2. The structure of claim 1 in which said cam means comprises an inclined cam projection on one of said members extending within a recess of the other member providing an inclined cam-engagement surface.

3. Apparatus according to claim 1 in which the teeth of said disk are mounted around the periphery of said disk.

4. The structure of claim 1 in which a spring is mounted between said drum and disk and is normally held in compressed position by the weight of said disk so that the disk operates with its teeth in spaced relation from the teeth of said fixed plate during normal operation of the vehicle.

5. In a reel structure, a hollow casing, a fixed plate secured to the top of the casing and having depending teeth, a vertically-movable inertia disk below said fixed plate and having upwardly-extending teeth normally spaced from said depending teeth, a guide pin vertically positioned in said casing and fixed to the bottom of the casing, said inertia disk being apertured to receive said guide pin, a cable drum also apertured to receive said pin and containing about its periphery a cable, and a coil spring fixed to said drum and casing for rotating said drum to bias said cable toward said drum, said drum being provided with elongated slots and said inertia disk being provided with depending lugs received within said slots for connecting said inertia disk and drum in all positions, said inertia disk being provided with cam slots providing inclined cam surfaces and said drum being provided with inclined cam projections aligned with said cam-engagement surfaces whereby upon sudden forward movement of said cable, as when the vehicle suddenly decelerates, said inertia disk moves upwardly to bring its teeth into engagement with the teeth of said fixed plate to restrain outward movement of said cable, said inertia plate then dropping under its own weight to non-teeth engaging position.

6. The structure of claim 5 in which said casing is provided with a plastic guide through which the cable leaves the casing.

References Cited

UNITED STATES PATENTS

| | | | |
|---|---|---|---|
| 3,058,687 | 10/1962 | Bentley | 242—107.4 |
| 3,323,749 | 6/1967 | Karlsson | 242—107.4 |
| 3,335,974 | 8/1967 | Glauser et al. | 242—107.4 |

WILLIAM S. BURDEN, *Primary Examiner.*